United States Patent
Kita et al.

(10) Patent No.: US 12,509,254 B2
(45) Date of Patent: Dec. 30, 2025

(54) GAS TURBINE SYSTEM THAT MITIGATES BATTERY ELECTRICITY CONSUMPTION DURING STARTING OR STOPPING OF A GAS TURBINE ENGINE

(71) Applicant: HONDA MOTOR CO., LTD., Tokyo (JP)

(72) Inventors: Akinori Kita, Wako (JP); Kenro Udono, Wako (JP); Takeshi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/533,165

(22) Filed: Nov. 23, 2021

(65) Prior Publication Data
US 2022/0195941 A1 Jun. 23, 2022

(30) Foreign Application Priority Data
Dec. 22, 2020 (JP) .................................. 2020-212829

(51) Int. Cl.
*F02C 7/36* (2006.01)
*B64U 50/11* (2023.01)
(Continued)

(52) U.S. Cl.
CPC ............. *B64U 50/11* (2023.01); *B64U 50/34* (2023.01); *F01D 15/10* (2013.01); *F02C 7/268* (2013.01);
(Continued)

(58) Field of Classification Search
None
See application file for complete search history.

(56) References Cited

U.S. PATENT DOCUMENTS 9,493,245 B2    11/2016   Salyer
10,151,246 B2   12/2018   Poumarede et al.
(Continued)

FOREIGN PATENT DOCUMENTS

CN    101680365    3/2010
CN    109026389    12/2018
(Continued)

OTHER PUBLICATIONS

Extended European Search Report for European Patent Application No. 21209762.0 mailed May 19, 2022.
(Continued)

*Primary Examiner* — Phutthiwat Wongwian
*Assistant Examiner* — Jacek Lisowski
(74) *Attorney, Agent, or Firm* — Amin, Turocy & Watson, LLP

(57) ABSTRACT

Provided is a gas turbine system in which electricity consumption of a battery when starting or stopping a gas turbine engine is reduced and sufficient battery power during flight can be secured. The present invention includes a plurality of gas turbine engines 21, 22, and 23, generators 41, 42, and 43, a battery 5, and a controller 7. The controller 7 decides at least one main starting gas turbine engine 21 from the plurality of gas turbine engines before the plurality of gas turbine engines are started, starts the main starting gas turbine engine 21 using electricity from the battery 5, and starts the secondary starting gas turbine engines 22 and 23 of the plurality of gas turbine engines other than the main starting gas turbine engine 21 using electricity from the generator 41 connected to the main starting gas turbine engine 21 after the main starting gas turbine engine 21 reaches a steady state.

6 Claims, 5 Drawing Sheets

(51) Int. Cl.
*B64U 50/34* (2023.01)
*F01D 15/10* (2006.01)
*F02C 7/268* (2006.01)
*B64U 10/13* (2023.01)
*B64U 30/20* (2023.01)

(52) U.S. Cl.
CPC ............... *F02C 7/36* (2013.01); *B64U 10/13* (2023.01); *B64U 30/20* (2023.01); *F05D 2220/323* (2013.01); *F05D 2220/76* (2013.01); *F05D 2260/85* (2013.01)

(56) References Cited

U.S. PATENT DOCUMENTS

| | | | | |
|---|---|---|---|---|
| 2010/0058731 | A1* | 3/2010 | Haehner | F01D 15/10 290/46 |
| 2013/0086919 | A1* | 4/2013 | Dooley | B64C 27/12 60/778 |
| 2013/0233977 | A1* | 9/2013 | Smiley | B64D 33/00 244/53 A |
| 2016/0333782 | A1* | 11/2016 | Morgan | F02C 7/36 |
| 2017/0175856 | A1* | 6/2017 | Beddok | B64C 27/12 |
| 2018/0080380 | A1* | 3/2018 | Simonetti | B64D 35/08 |
| 2018/0355764 | A1* | 12/2018 | Clauson | F01D 21/20 |
| 2019/0002117 | A1* | 1/2019 | Gansler | B64D 27/33 |
| 2019/0203646 | A1* | 7/2019 | Cannella | F03G 1/00 |
| 2019/0210445 | A1* | 7/2019 | Orbeck, Jr. | B60K 6/00 |
| 2019/0322379 | A1* | 10/2019 | Mackin | F02C 7/057 |
| 2020/0095939 | A1* | 3/2020 | Epstein | B64D 33/08 |

FOREIGN PATENT DOCUMENTS

| | | |
|---|---|---|
| EP | 2581586 | 4/2013 |
| EP | 3650350 | 5/2020 |
| JP | 2001-334998 | 12/2001 |

OTHER PUBLICATIONS

Chinese Office Action for Chinese Patent Application No. 202111398205.6 mailed Aug. 19, 2023.

Japanese Office Action for Japanese Patent Application No. 2020-212829 mailed May 30, 2023.

* cited by examiner

GAS TURBINE SYSTEM THAT MITIGATES BATTERY ELECTRICITY CONSUMPTION DURING STARTING OR STOPPING OF A GAS TURBINE ENGINE

CROSS-REFERENCE TO RELATED APPLICATION

Priority is claimed on Japanese Patent Application No. 2020-212829, filed Dec. 22, 2020, the content of which is incorporated herein by reference.

FIELD OF THE INVENTION

The present invention relates to a gas turbine system.

DESCRIPTION OF RELATED ART

In the related art, regarding power sources for propulsion of an aircraft or the like, constitutions of gas turbine systems having a plurality of gas turbine engines mounted therein are known. For these gas turbine systems, various technologies in which generators are respectively connected to the plurality of gas turbine engines and a propeller of an aircraft is driven using electricity from these generators, a battery, or the like have been proposed.

For example, Patent Document 1 (specification of U.S. Pat. No. 9,493,245) discloses a constitution of a gas turbine system including a plurality of gas turbine engines, generators that are connected to the gas turbine engines, and a battery that supplies electricity to an electric motor of a propeller. When the gas turbine engines or the battery is operated, electricity generated from the gas turbine engines causes the electric motor to be operated. According to the technology described in Patent Document 1, since the electric motor is constituted to selectively respond to the generators or the battery, it is possible to cope with various circumstances such as malfunction of the gas turbine engines.

SUMMARY OF THE INVENTION

Technical Problem

Incidentally, in the related art, when starting an engine on the ground, a plurality of gas turbine engines are started using electricity from a battery. Similarly, after the gas turbine engines were stopped on the ground, motoring of the gas turbine engines was performed using electricity from the battery. For this reason, there was concern that a significant amount of battery power might be consumed to cope with starting and stopping of the engines on the ground.

Moreover, for example, in a circumstance in which a load of electricity is significant, such as times of taking off and landing, electricity of a battery may be used together with electricity generated from a gas turbine engine. For this reason, from the viewpoint of securing sufficient electricity from a battery during flight, it is not preferable that a large amount of electricity of a battery be consumed when starting and stopping an engine on the ground. Therefore, in technologies in the related art such as Patent Document 1, there have been problems in reducing electricity consumption of a battery particularly when starting or stopping an engine on the ground and securing battery power during flight.

Hence, an object of the present invention is to provide a gas turbine system in which electricity consumption of a battery when starting or stopping a gas turbine engine is reduced and sufficient battery power during flight can be secured.

Solution to Problem

A gas turbine system according to this invention has the following constitution.

(1) A gas turbine system according to an aspect of the present invention includes a plurality of gas turbine engines that are mounted in an airframe of an aircraft, generators that are respectively connected to rotary shafts of the plurality of gas turbine engines, a battery that stores electricity generated by the generators, an electric motor that is driven by electricity from at least one of the generators and the battery, a propeller that is driven by the electric motor, and a controller that controls outputs of the gas turbine engines. The controller decides at least one main starting gas turbine engine from the plurality of gas turbine engines before the plurality of gas turbine engines are started, starts the main starting gas turbine engine using electricity from the battery, and starts a secondary starting gas turbine engine of the plurality of gas turbine engines other than the main starting gas turbine engine using only electricity from the generator connected to the main starting gas turbine engine after the main starting gas turbine engine reaches a steady state.

(2) In the gas turbine system according to the foregoing (1), the controller may decide at least one main stopping gas turbine engine from the plurality of gas turbine engines before the plurality of gas turbine engines are stopped, may stop driving of a secondary stopping gas turbine engine of the plurality of gas turbine engines other than the main stopping gas turbine engine, may perform motoring of the secondary stopping gas turbine engine using only electricity from the generator connected to the main stopping gas turbine engine, and may stop driving of the main stopping gas turbine engine and perform motoring of the main stopping gas turbine engine using electricity from the battery after motoring of the secondary stopping gas turbine engine is completed.

(3) In the gas turbine system according to the foregoing (2), the controller may stop motoring of the secondary stopping gas turbine engine and stop driving of the main stopping gas turbine engine after a temperature of the secondary stopping gas turbine engine becomes a predetermined temperature or lower, and may stop motoring of the main stopping gas turbine engine after a temperature of the main stopping gas turbine engine becomes a predetermined temperature or lower.

(4) A gas turbine system according to another aspect of the present invention includes a plurality of gas turbine engines that are mounted in an airframe of an aircraft, generators that are respectively connected to rotary shafts of the plurality of gas turbine engines, a battery that stores electricity generated by the generators, an electric motor that is driven by electricity from at least one of the generators and the battery, a propeller driven by the electric motor, and a controller that controls outputs of the gas turbine engines. The controller decides at least one main starting gas turbine engine from the plurality of gas turbine engines before the plurality of gas turbine engines are started, starts the main starting gas turbine engine using electricity from the battery, and starts a secondary starting gas turbine engine of the plurality of gas turbine engines other than the main starting gas turbine engine using mixed electricity of electricity from the generator connected to the main starting gas turbine engine and electricity from the battery after the main starting gas turbine engine reaches a steady state.

Advantageous Effects of Invention

According to the aspect of (1), only the main starting gas turbine engine selected from the plurality of gas turbine engines is started using battery power. Since the battery need only drive the main starting gas turbine engine of the plurality of gas turbine engines, electricity consumption of the battery can be reduced compared to the technologies in the related art in which all of the plurality of gas turbine engines are driven by the electricity from the battery. After the main starting gas turbine engine reaches a steady state, the remaining secondary starting gas turbine engines are started using only the electricity from the generator connected to the main starting gas turbine engine. Accordingly, since battery power is not used for driving of the remaining secondary starting gas turbine engines, electricity consumption of the battery can be reduced. That is, only the electricity for starting the main starting gas turbine engine is required regarding battery power which is consumed when starting the engines.

Therefore, electricity consumption of the battery when starting the gas turbine engines can be reduced compared to the technologies in the related art, and thus sufficient battery power during flight can be secured.

Here, in the technologies in the related art, regarding a method for curbing electricity consumption of the battery, the gas turbine engine may be started using a ground power unit installed on the ground. However, in this case, there is a need to take off at a location where a ground power unit is installed, such places being limited. According to the gas turbine system of the present invention, since electricity consumption of the battery can be reduced even if no ground power unit is used, take off can be performed without being limited to the location of a ground power unit. Moreover, since electricity consumption of the battery on the ground can be reduced compared to the technologies in the related art, the capacity of the battery can be reduced, and thus the battery can be miniaturized. Accordingly, since the weight of the airframe can also be reduced, a flight can be taken with less energy than that in the related art, and thus energy saving of the aircraft can be improved.

According to the aspect of (2), when stopping the engines, first, driving of the remaining secondary stopping gas turbine engines other than the selected main stopping gas turbine engine is stopped. At this time, since the main stopping gas turbine engine is being driven, motoring of the secondary stopping gas turbine engines can be performed using only the electricity from the generator connected to the main stopping gas turbine engine. Due to motoring thereof, the secondary stopping gas turbine engines can be quickly cooled, and thus occurrence of damage to the engines due to heat can be curbed. Moreover, motoring of the secondary stopping gas turbine engines can be performed without consuming battery power. Next, after motoring of the secondary stopping gas turbine engines is completed, driving of the main stopping gas turbine engine is stopped, and motoring of the main stopping gas turbine engine is performed using electricity from the battery. Accordingly, the battery is used for only motoring the main stopping gas turbine engine of the plurality of gas turbine engines. That is, only the electricity for motoring the main stopping gas turbine engine is required regarding battery power which is consumed when stopping the engines (when motoring). Thus, electricity consumption of the battery can be reduced compared to the technologies in the related art in which all of the plurality of gas turbine engines are subjected to motoring by means of electricity from the battery.

Therefore, electricity consumption of the battery when stopping the gas turbine engines is reduced compared to the technologies in the related art, and thus sufficient battery power during flight can be secured.

Since there is no need to use a ground power unit when stopping the engines, landing can be performed without having places being limited. Moreover, in the technologies in the related art, regarding a method for reducing electricity consumption of the battery when motoring, idling may be performed on the ground. However, exhaust gas is discharged due to combustion of the engines during idling. According to the gas turbine system of the present invention, since there is no need to perform idling, both reduction in the discharging amount of exhaust gas and reduction in electricity consumption of the battery can be achieved.

According to the aspect of (3), when the temperatures of the secondary stopping gas turbine engines become a predetermined temperature or lower, the controller stops motoring of the secondary stopping gas turbine engines and stops driving of the main stopping gas turbine engine. When the temperature of the main stopping gas turbine engine becomes a predetermined temperature or lower, motoring of the main stopping gas turbine engine is stopped. Each of the gas turbine engines can be effectively cooled within a short period of time by switching between starting and stopping of motoring in accordance with the temperatures. Thus, electricity consumption of the battery when stopping is reduced, and the gas turbine engine can be efficiently cooled.

According to the aspect of (4), first, only the main starting gas turbine engine selected from the plurality of gas turbine engines is started using battery power. After the main starting gas turbine engine reaches a steady state, the remaining secondary starting gas turbine engines are started using mixed electricity from the generator connected to the main starting gas turbine engine and from the battery. Accordingly, electricity generated by the main starting gas turbine engine can be allotted as part of the electricity necessary to start the secondary starting gas turbine engines. Thus, electricity consumption of the battery can be reduced compared to the technologies in the related art in which all of the gas turbine engines are driven by means of only the battery power.

Therefore, electricity consumption of the battery when starting the gas turbine engines can be reduced compared to the technologies in the related art, and thus sufficient battery power during flight can be secured.

Since there is no need to use a ground power unit when stopping the engines, landing can be performed without being limited to the location of a ground power unit. Moreover, since electricity consumption of the battery on the ground can be reduced compared to the technologies in the related art, the capacity of the battery can be reduced, and thus the battery can be miniaturized. Accordingly, since the weight of the airframe can also be reduced, a flight can be taken with an energy smaller than that in the related art, and thus energy saving of the aircraft can be improved.

DETAILED DESCRIPTION OF THE INVENTION

Hereinafter, embodiments of the present invention will be described with reference to the drawings.

(Gas Turbine System)

Figure 1:
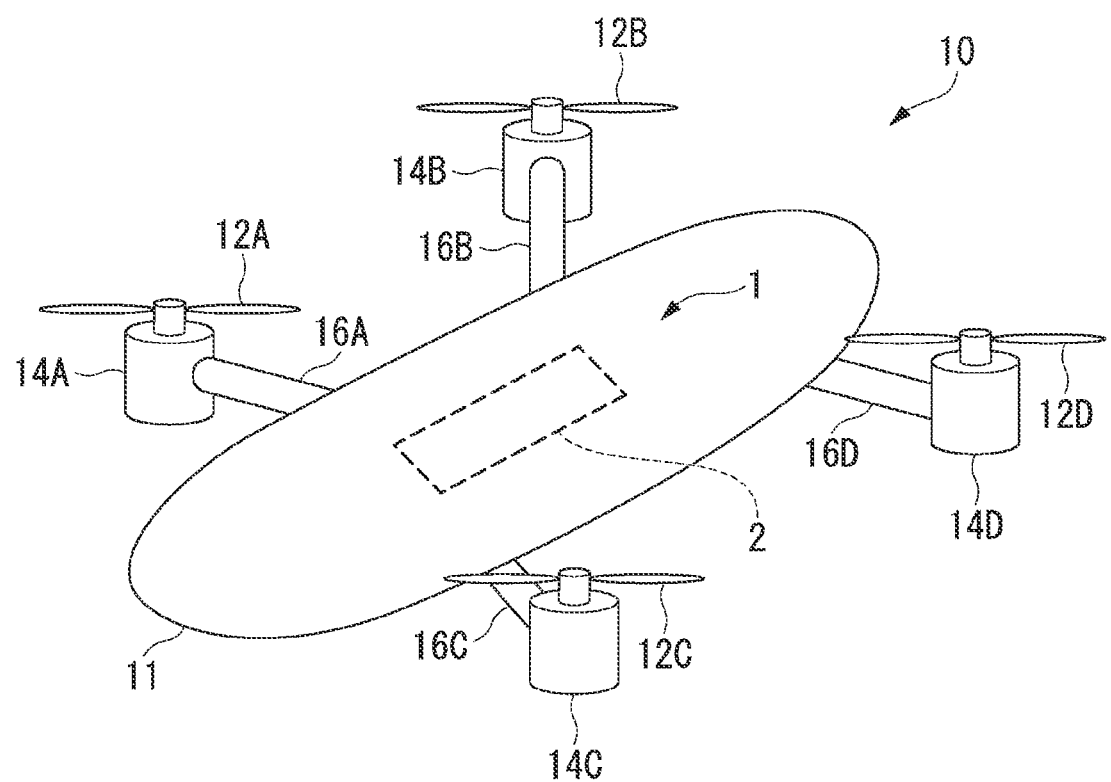
FIG. 1 is a view of an appearance of an aircraft in which a gas turbine system according to a first embodiment is mounted.

FIG. 1 is a view of an appearance of an aircraft 10 in which a gas turbine system 1 according to a first embodiment is mounted.

For example, the aircraft 10 includes an airframe 11 and the gas turbine system 1. The gas turbine system 1 has a plurality of rotors 12A to 12D (propellers in the claims), a plurality of electric motors 14A to 14D, attachment members 16A to 16D, and a gas turbine system main body 2. Hereinafter, when the plurality of rotors 12A to 12D are not distinguished from each other, they will be referred to as the rotors 12. When the plurality of electric motors 14A to 14D are not distinguished from each other, they will be referred to as the electric motors 14.

The rotor 12A is attached to the airframe 11 via the attachment member 16A. The electric motor 14A is attached to a base portion (rotary shaft) of the rotor 12A. The electric motor 14A drives the rotor 12A. For example, the electric motor 14A is a brushless DC motor. The rotor 12A is a fixed wing of a blade which rotates around an axis parallel to a direction of gravity when the aircraft 10 has a level orientation. Since the rotors 12B to 12D, the attachment members 16B to 16D, and the electric motors 14B to 14D also have functional constitutions similar to those described above, description thereof will be omitted.

When the rotors 12 rotate in response to a control signal, the aircraft 10 flies with desired flight characteristics. A control signal controls the aircraft 10 based on an operation by an operator or an instruction in automatic flight control. For example, the aircraft 10 flies with the rotor 12A and the rotor 12D rotating in a first direction (for example, the clockwise direction) and the rotor 12B and the rotor 12C rotating in a second direction (for example, the counterclockwise direction). In addition to the foregoing rotors 12, an auxiliary rotor, a fixed wing, or the like (not shown) for maintaining a posture or for horizontal propulsion may be provided.

Figure 2:
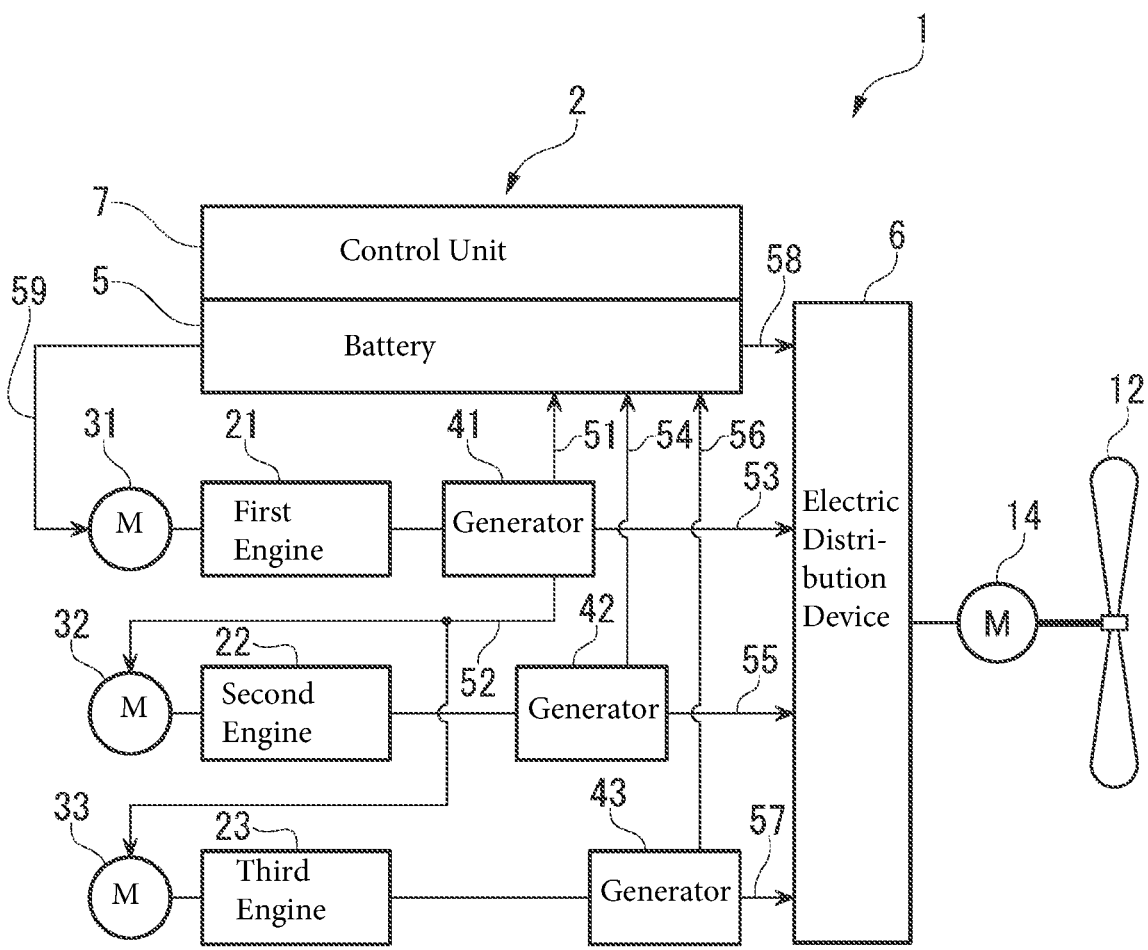
FIG. 2 is a schematic view of a constitution of the gas turbine system according to the first embodiment.

FIG. 2 is a schematic view of a constitution of the gas turbine system 1 according to the first embodiment.

The gas turbine system 1 has the gas turbine system main body 2 for generating electricity which becomes a power source driving the rotors 12A to 12D (refer to FIG. 1) described above. The gas turbine system main body 2 is mounted inside the aircraft 10. The gas turbine system main body 2 is constituted of so-called gas turbine engines. The gas turbine system main body 2 includes a plurality of gas turbine engines 21, 22, and 23, a plurality of starter motors 31, 32, and 33, a plurality of generators 41, 42, and 43, a battery 5, an electricity distribution device 6, and a control unit 7 (controller in claims). Each of the battery 5, the electricity distribution device 6, and the control unit 7 may be made redundant as necessary.

(Plurality of Gas Turbine Engines)

The plurality of gas turbine engines 21, 22, and 23 include a first gas turbine engine (which may hereinafter be simply referred to as a first engine 21), a second gas turbine engine (which may hereinafter be simply referred to as a second engine 22), and a third gas turbine engine (which may hereinafter be simply referred to as a third engine 23).

The first engine 21 has a compressor, a turbine, and a rotary shaft connecting the compressor and the turbine to each other (none is shown). The compressor compresses intake air taken in through a ventilation hole (not shown) provided in the airframe 11 of the aircraft 10. The turbine is connected to the compressor and rotates integrally with the compressor. The first starter motor 31 is connected to the first engine 21. Specifically, the first starter motor 31 is disposed on the compressor side of the first engine 21 in an axial direction. For example, the first starter motor 31 is provided coaxially with the compressor of the first engine 21. When starting the first engine 21, first of all, the first starter motor 31 starts to be driven. The first engine 21 is started by a rotation force transmitted from the first starter motor 31.

The second engine 22 is provided such that it is parallel to the first engine 21. In other words, the second engine 22 can be operated independently from the first engine 21. The second engine 22 has a compressor, a turbine, and a rotary shaft connecting the compressor and the turbine to each other (none is shown). Since the constitutions of the compressor, the turbine, and the rotary shaft of the second engine 22 are equivalent to the constitution of the first engine 21, detailed description thereof will be omitted. The second starter motor 32 is connected to the second engine 22. Specifically, the second starter motor 32 is disposed on the compressor side of the second engine 22 in the axial direction. For example, the second starter motor 32 is provided coaxially with the compressor of the second engine 22. When starting the second engine 22, first, the second starter motor 32 starts to be driven. The second engine 22 is started by a rotation force transmitted from the second starter motor 32.

The third engine 23 is provided such that it is parallel to each of the first engine 21 and the second engine 22. In other words, the third engine 23 can be operated independently from the first engine 21 and the second engine 22. The third engine 23 has a compressor, a turbine, and a rotary shaft connecting the compressor and the turbine to each other (none is shown). Since the constitutions of the compressor, the turbine, and the rotary shaft of the third engine 23 are equivalent to the constitution of the first engine 21, detailed description thereof will be omitted. The third starter motor 33 is connected to the third engine 23. Specifically, the third starter motor 33 is disposed on the compressor side of the third engine 23 in the axial direction. For example, the third starter motor 33 is provided coaxially with the compressor of the third engine 23. When starting the third engine 23, first of all, the third starter motor 33 starts to be driven. The third engine 23 is started by a rotation force transmitted from the third starter motor 33.

(Plurality of Generators)

The plurality of generators 41, 42, and 43 include the first generator 41, the second generator 42, and the third generator 43.

The first generator 41 is connected to the rotary shaft of the first engine 21 via a transmission shaft and a deceleration mechanism (not shown). The first generator 41 is disposed on the turbine side of the first engine 21 in the axial direction. The first generator 41 is provided coaxially with the rotary shaft of the first engine 21. The deceleration mechanism is provided between the first engine 21 and the first generator 41. The first generator 41 generates electricity (AC electricity) through driving of the first engine 21. AC electricity generated by the first generator 41 is converted into DC electricity by a converter of a power drive unit (PDU) (not shown) and is stored in the battery 5 via a first circuit 51. Moreover, the first generator 41 is connected to the second starter motor 32 and the third starter motor 33 via a second circuit 52. Furthermore, the first generator 41 is connected to the electricity distribution device 6 via a third circuit 53.

The second generator 42 is connected to the rotary shaft of the second engine 22 via a transmission shaft and a deceleration mechanism (not shown). The second generator 42 is disposed on the turbine side of the second engine 22 in the axial direction. The second generator 42 is provided coaxially with the rotary shaft of the second engine 22. The deceleration mechanism is provided between the second engine 22 and the second generator 42. The second generator 42 generates electricity (AC electricity) through driving of the second engine 22. AC electricity generated by the second generator 42 is converted into DC electricity by the converter of the power drive unit (PDU) (not shown) and is stored in the battery 5 via a fourth circuit 54. Moreover, the second generator 42 is connected to the electricity distribution device 6 via a fifth circuit 55.

The third generator 43 is connected to the rotary shaft of the third engine 23 via a transmission shaft and a deceleration mechanism (not shown). The third generator 43 is disposed on the turbine side of the third engine 23 in the axial direction. The third generator 43 is provided coaxially with the rotary shaft of the third engine 23. The deceleration mechanism is provided between the third engine 23 and the third generator 43. The third generator 43 generates electricity (AC electricity) through driving of the third engine 23. AC electricity generated by the third generator 43 is converted into DC electricity by the converter of the power drive unit (PDU) (not shown) and is stored in the battery 5 via a sixth circuit 56. Moreover, the third generator 43 is connected to the electricity distribution device 6 via a seventh circuit 57.

(Battery)

One battery 5 is provided for the plurality of generators 41, 42, and 43. The battery 5 is connected to each of the plurality of generators 41, 42, and 43 and stores electricity generated by each of the generators 41, 42, and 43. In other words, electricity from the plurality of generators is supplied to the single battery 5. The battery 5 is connected to the electricity distribution device 6 via an eighth circuit 58. Discharge electricity from the battery 5 is supplied to the electric motors 14 via the electricity distribution device 6, which will be described below in detail. Thus, the electric motors 14 are driven by discharge electricity from the battery 5.

Moreover, the battery 5 is connected to the first starter motor 31 via a ninth circuit 59. The battery 5 can supply electricity to the first starter motor 31. The first starter motor 31 is driven by means of electricity from the battery 5. The battery 5 may be internally equipped with a battery management system (BMS) (not shown) for carrying out self-diagnosis of the residual state of charge (SOC).

(Electricity Distribution Device)

The electricity distribution device 6 is connected to each of the plurality of generators (the first generator 41, the second generator 42, and the third generator 43) and the battery 5. The electricity distribution device 6 arbitrarily receives supply of electricity from the generators or the battery 5 and supplies supplied electricity to the electric motors 14. Accordingly, the electric motors 14 are driven. In other words, the electric motors 14 are driven by electricity from at least one of the generators and the battery 5. In the present embodiment, the electric motors 14 are driven by means of both electricity from the generators and electricity from the battery 5.

(Control Unit)

The control unit 7 controls the outputs of the plurality of gas turbine engines. In the following description, control performed by the control unit 7 when starting the gas turbine engines and when stopping the gas turbine engines will be described. The control unit 7 may also perform various kinds of control at times other than the time of starting or stopping the gas turbine engines (for example, when taking off and landing, when cruising, or the like of the aircraft 10).

The control unit 7 controls on/off of the first to ninth circuits 51, 52, 53, 54, 55, 56, 57, 58, and 59. When the first circuit 51 is turned on, electricity generated by the first generator 41 is supplied to the battery 5. When the second circuit 52 is turned on, electricity generated by the first generator 41 is supplied to the second starter motor 32 and the third starter motor 33. When the third circuit 53 is turned on, electricity generated by the first generator 41 is supplied to the electricity distribution device 6. When the fourth circuit 54 is turned on, electricity generated by the second generator 42 is supplied to the battery 5. When the fifth circuit 55 is turned on, electricity generated by the second generator 42 is supplied to the electricity distribution device 6. When the sixth circuit 56 is turned on, electricity generated by the third generator 43 is supplied to the battery 5. When the seventh circuit 57 is turned on, electricity generated by the third generator 43 is supplied to the electricity distribution device 6. When the eighth circuit 58 is turned on, electricity stored in the battery 5 is supplied to the electricity distribution device 6. When the ninth circuit 59 is turned on, electricity stored in the battery 5 is supplied to the first starter motor 31, and the first starter motor 31 is driven. Namely, when the ninth circuit 59 is turned on, the first engine 21 is started.

The control unit 7 controls such on/off timings of the first to ninth circuits 51, 52, 53, 54, 55, 56, 57, 58, and 59, thereby controlling the sequence of driving or stopping each of the plurality of gas turbine engines 21, 22, and 23 and the timings thereof at the times of starting and stopping the gas turbine engines.

First, control (engine starting control) of the control unit 7 when starting the gas turbine engines will be described.

Before the gas turbine engines are started, the control unit 7 selects at least one gas turbine engine from the plurality of gas turbine engines as a main starting gas turbine engine. The remaining gas turbine engines of the plurality of gas turbine engines 21, 22, and 23 other than the main starting gas turbine engine serve as secondary starting gas turbine engines. First, the control unit 7 starts the main starting gas turbine engine using electricity from the battery 5. After the main starting gas turbine engine reaches a steady state, the control unit 7 starts the secondary starting gas turbine engines using only the electricity from the generator connected to the main starting gas turbine engine.

Figure 3:
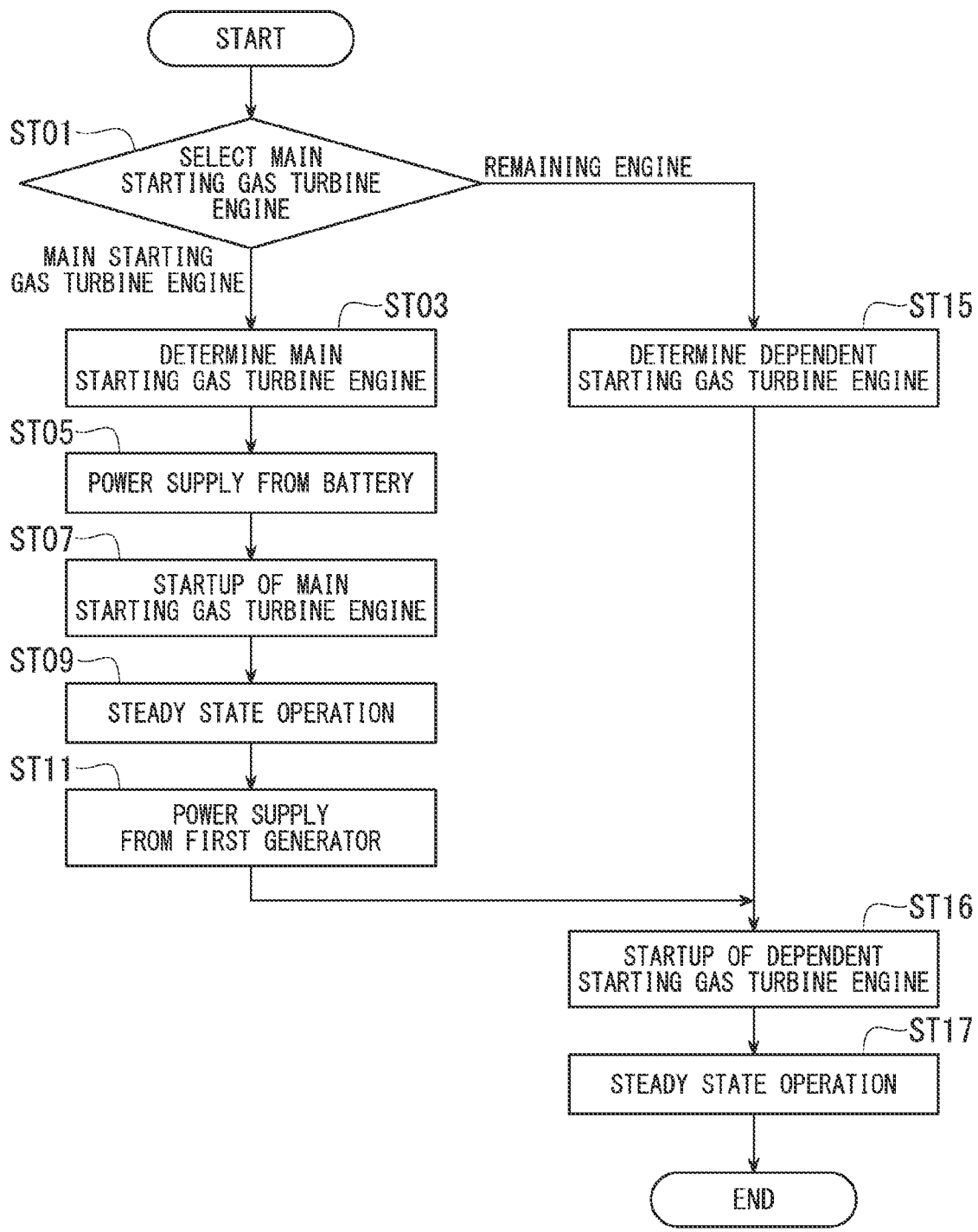
FIG. 3 is a flowchart for describing a flow of engine starting control performed by a control unit when starting an engine of the gas turbine system according to the first embodiment.

FIG. 3 is a flowchart for describing a flow of engine starting control performed by the control unit 7 when starting the engines in the gas turbine system 1 according to the first embodiment. With reference to FIG. 3, a flow of engine starting control performed by the control unit 7 will be described in detail.

Before the gas turbine engines are started, first, the control unit 7 selects the main starting gas turbine engine (ST01). In the present embodiment, the control unit 7 decides the first engine 21 as the main starting gas turbine engine (ST03). The starter motor (in the present embodiment, the first starter motor 31) of the main starting gas turbine engine 21 is connected to the battery 5.

Next, the control unit 7 causes electricity from the battery 5 to be supplied to the first starter motor 31 by turning on the ninth circuit 59 (ST05). Accordingly, the first starter motor 31 is driven, and the first engine 21 is started by means of a rotation force of the first starter motor 31 (ST07). When the first engine 21 is driven, electricity is generated by the first generator 41 connected to the first engine 21.

When the first engine 21 reaches a steady operation after the lapse of a predetermined time from starting of the first engine 21, the control unit 7 turns on the second circuit 52, thereby supplying electricity from the first generator 41 to the second starter motor 32 and the third starter motor 33 (ST11).

Here, the remaining gas turbine engines of the plurality of gas turbine engines other than the main starting gas turbine engine 21 serve as the secondary starting gas turbine engines. In the present embodiment, the control unit 7 decides the second engine 22 and the third engine 23 as the secondary starting gas turbine engines (ST15).

After the first engine 21 is started, when the second starter motor 32 and the third starter motor 33 are driven by means of electricity from the first generator 41, the second engine 22 and the third engine 23 are respectively started by means of rotation forces of the second starter motor 32 and the third starter motor 33 (ST16). When the second engine 22 is driven, electricity is generated by the second generator 42 connected to the second engine 22. When the third engine 23 is driven, electricity is generated by the third generator 43 connected to the third engine 23.

When the second engine 22 and the third engine 23 reach a steady operation after the lapse of a predetermined time from starting of the second engine 22 and the third engine 23 (ST17), the control unit 7 ends the flow related to engine starting control.

In the flow described above, the control unit 7 may cause a part of electricity generated by the first generator 41 to be supplied to the battery 5 by turning on the first circuit 51. Part of electricity generated by the first generator 41 may be supplied to the electricity distribution device 6 by turning on the third circuit 53. Similarly, in the flow described above, the control unit 7 may cause part of electricity generated by the second generator 42 to be supplied to the battery 5 by turning on the fourth circuit 54. Part of electricity generated by the second generator 42 may be supplied to the electricity distribution device 6 by turning on the fifth circuit 55. The control unit 7 may cause part of electricity generated by the third generator 43 to be supplied to the battery 5 by turning on the sixth circuit 56. Part of electricity generated by the third generator 43 may be supplied to the electricity distribution device 6 by turning on the seventh circuit 57.

Next, control (engine stopping control) of the control unit 7 when stopping the gas turbine engines will be described.

With reference to FIG. 2, before the gas turbine engines are stopped, the control unit 7 selects at least one gas turbine engine from the plurality of gas turbine engines 21, 22, and 23 as a main stopping gas turbine engine. The remaining gas turbine engines of the plurality of gas turbine engines 21, 22, and 23 other than the main stopping gas turbine engine serve as secondary stopping gas turbine engines. First, the control unit 7 stops driving of the secondary stopping gas turbine engines and performs motoring of the secondary stopping gas turbine engines using only the electricity from the generator connected to the main stopping gas turbine engine. After motoring of the secondary stopping gas turbine engines is completed, the control unit 7 stops driving of the main stopping gas turbine engine and performs motoring of the main stopping gas turbine engine using electricity from the battery 5.

Figure 4:
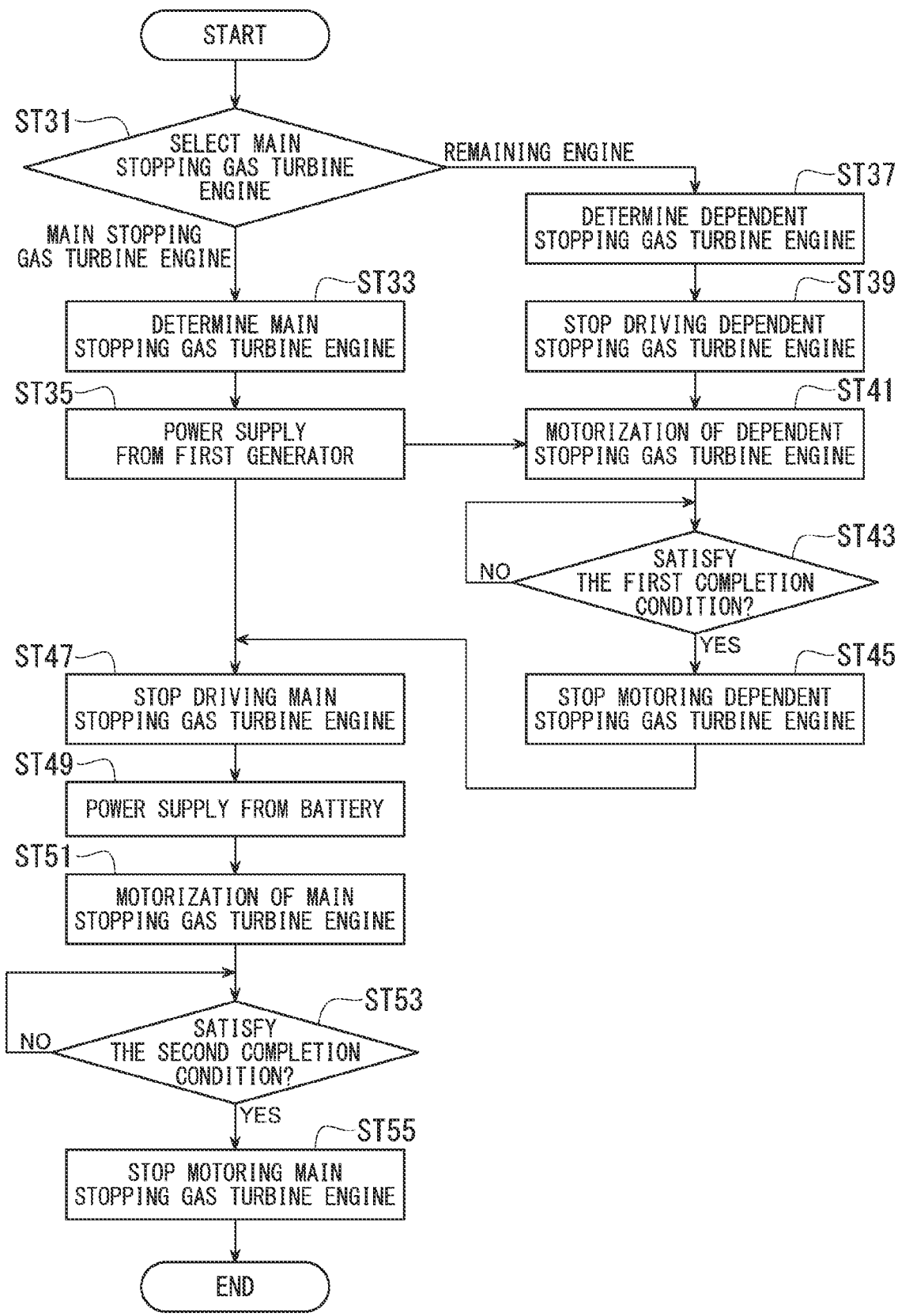
FIG. 4 is a flowchart for describing a flow of engine stopping control performed by the control unit when stopping the engines (when motoring) of the gas turbine system according to the first embodiment.

FIG. 4 is a flowchart for describing a flow of engine stopping control performed by the control unit 7 when stopping the engines (when motoring) in the gas turbine system 1 according to the first embodiment. With reference to FIG. 4, a flow of engine stopping control performed by the control unit 7 will be described in detail.

Before engine stopping control is performed by the control unit 7, all of the plurality of gas turbine engines 21, 22, and 23 are in a state of being driven. Before the gas turbine engines are stopped, first, the control unit 7 selects the main stopping gas turbine engine (ST31). In the present embodiment, the control unit 7 decides the first engine 21 as the main stopping gas turbine engine (ST33).

The remaining gas turbine engines of the plurality of gas turbine engines 21, 22, and 23 other than the main stopping gas turbine engine 21 serve as the secondary stopping gas turbine engines. In the present embodiment, the control unit 7 decides the second engine 22 and the third engine 23 as the secondary stopping gas turbine engines (ST37). First, the control unit 7 stops driving of the second engine 22 and the third engine 23 (ST39).

Next, in order to cool the second engine 22 and the third engine 23 which have been stopped, the control unit 7 performs motoring of the second engine 22 and the third engine 23 (ST41). For example, in motoring, when a rotation force from the starter motor or the like is transmitted, each of the engines are rotated and outside air is suctioned without combustion. Accordingly, the engines are cooled. At this time, the control unit 7 causes electricity generated by the first generator 41 to be supplied to the second starter motor 32 and the third starter motor 33 by turning on the second circuit 52 (ST35). Namely, only the electricity from the first generator 41 connected to the first engine 21 is allotted as electricity necessary to perform motoring of the second engine 22 and the third engine 23.

Next, the control unit 7 determines whether or not the second engine 22 and the third engine 23 have satisfied a first completion condition (ST43). For example, when oil temperatures around bearings in the second engine 22 and the third engine 23 become a predetermined temperature or lower, the control unit 7 judges that the first completion condition has been satisfied. When it is determined that the second engine 22 and the third engine 23 have satisfied the first completion condition (YES in ST43), the control unit 7 stops motoring of the second engine 22 and the third engine 23 (ST45). When it is determined that the second engine 22 and the third engine 23 have not satisfied the first completion condition (NO in ST43), the control unit 7 repeats comparison between the temperatures of the second engine 22 and the third engine 23 and a predetermined temperature every predetermined time until the first completion condition is satisfied.

When the second engine 22 and the third engine 23 satisfy the first completion condition and driving of the second engine 22 and the third engine 23 is stopped, the control unit 7 stops driving of the first engine 21 (ST47).

Next, the control unit 7 causes electricity from the battery 5 to be supplied to the first starter motor 31 by turning on the ninth circuit 59 (ST49). The control unit 7 performs motoring of the stopped first engine 21 by means of electricity from the battery 5 (ST51). Namely, electricity from the battery 5 is allotted as electricity necessary to perform motoring of the first engine 21.

Next, the control unit 7 determines whether or not the first engine 21 has satisfied a second completion condition (ST53). For example, when oil temperatures around bearings in the first engine 21 become a predetermined temperature or lower, the control unit 7 judges that the second completion condition has been satisfied. When it is determined that the first engine 21 has satisfied the second completion condition (YES in ST53), the control unit 7 stops motoring of the first engine 21 (ST55). When it is determined that the first engine 21 has not satisfied the second completion condition (NO in ST43), the control unit 7 repeats comparison between the temperature of the first engine 21 and a predetermined temperature every predetermined time until the second completion condition is satisfied.

When the first engine 21 satisfies the second completion condition and driving of the first engine 21 is stopped, the control unit 7 ends the flow related to engine stopping control.

In the flow described above, the control unit 7 may cause a part of electricity generated by the first generator 41 to be supplied to the battery 5 by turning on the first circuit 51. Part of electricity generated by the first generator 41 may be supplied to the electricity distribution device 6 by turning on the third circuit 53.

(Operations and Effects)

Next, operations and effects of the foregoing gas turbine system 1 will be described.

According to the gas turbine system 1 of the present embodiment, only the main starting gas turbine engine (the first engine 21) selected from the plurality of gas turbine engines is started using electricity from the battery 5. Since the battery 5 need only drive the main starting gas turbine engine 21 of the plurality of gas turbine engines, electricity consumption of the battery 5 can be reduced compared to the technologies in the related art in which all of the plurality of gas turbine engines are driven by the electricity from the battery 5. After the main starting gas turbine engine 21 reaches a steady state, the remaining secondary starting gas turbine engines (the second engine 22 and the third engine 23) are started using only the electricity from the generator connected to the main starting gas turbine engine 21. Accordingly, since electricity from the battery 5 is not used for driving the remaining secondary starting gas turbine engines 22 and 23, electricity consumption from the battery 5 can be reduced. That is, electricity consumed by the battery 5 when starting the engine is only electricity for starting the main starting gas turbine engine 21.

Therefore, electricity consumption of the battery 5 when starting the gas turbine engines can be reduced compared to the technologies in the related art, and thus sufficient electricity during flight from the battery 5 can be secured.

Here, in the technologies in the related art, regarding a method for curbing electricity consumption of the battery 5, the gas turbine engines may be started using a ground power unit installed on the ground. However, in this case, there is a need to take off at a location where a ground power unit is installed, such places being limited. According to the gas turbine system 1 of the present invention, since electricity consumption of the battery 5 can be reduced even if no ground power unit is used, take off can be performed without being limited to the location of a ground power unit. Moreover, since electricity consumption of the battery 5 on the ground can be reduced compared to the technologies in the related art, the capacity of the battery 5 can be reduced, and thus the battery 5 can be miniaturized. Accordingly, since the weight of the airframe 11 can also be reduced, a flight can be taken with an energy smaller than that in the related art, and thus energy saving of the aircraft 10 can be improved.

When stopping the engines, driving of the remaining secondary stopping gas turbine engines (the second engine 22 and the third engine 23) other than the selected main stopping gas turbine engine (the first engine 21) is stopped first. At this time, since the main stopping gas turbine engine 21 is being driven, motoring of the secondary stopping gas turbine engines 22 and 23 can be performed using only the electricity from the first generator 41 connected to the main stopping gas turbine engine 21. Due to motoring thereof, the secondary stopping gas turbine engines 22 and 23 can be quickly cooled, and thus occurrence of damage to the engines due to heat can be curbed. Moreover, motoring of the secondary stopping gas turbine engines 22 and 23 can be performed without consuming electricity from the battery 5. Next, after motoring of the secondary stopping gas turbine engines 22 and 23 is completed, driving of the main stopping gas turbine engine 21 is stopped, and motoring of the main stopping gas turbine engine 21 is performed using electricity from the battery 5. Accordingly, the battery 5 is used for only motoring the main stopping gas turbine engine 21 of the plurality of gas turbine engines. That is, only the electricity for motoring the main stopping gas turbine engine 21 is required regarding electricity from the battery 5 which is consumed when stopping the engines (when motoring). Thus, electricity consumption of the battery 5 can be reduced compared to the technologies in the related art in which all of the plurality of gas turbine engines are subjected to motoring by means of electricity from the battery 5.

Therefore, electricity consumption of the battery 5 when stopping the gas turbine engines is reduced compared to the technologies in the related art, and thus sufficient electricity during flight can be secured from the battery 5.

Since there is no need to use a ground power unit when stopping the engines, landing can be performed without being limited to the location of a ground power unit. Moreover, in the technologies in the related art, regarding a method for reducing electricity consumption of the battery 5 when motoring, idling may be performed on the ground. However, exhaust gas is discharged due to combustion of the engines during idling. According to the gas turbine system 1 of the present invention, since there is no need to perform idling, both reduction in the discharging amount of exhaust gas and reduction in electricity consumption of the battery 5 can be achieved.

When the temperatures of the secondary stopping gas turbine engines 22 and 23 becomes a predetermined temperature or lower, the control unit 7 stops motoring of the secondary stopping gas turbine engines 22 and 23 and stops driving of the main stopping gas turbine engine 21. When the temperature of the main stopping gas turbine engine 21 becomes a predetermined temperature or lower, motoring of the main stopping gas turbine engine 21 is stopped. Each of the gas turbine engines 21, 22, and 23 can be effectively cooled within a short period of time by switching between starting and stopping of motoring in accordance with the temperatures. Thus, electricity consumption of the battery 5 when stopping is reduced, and the gas turbine engines 21, 22, and 23 can be efficiently cooled.

Second Embodiment

Figure 5:
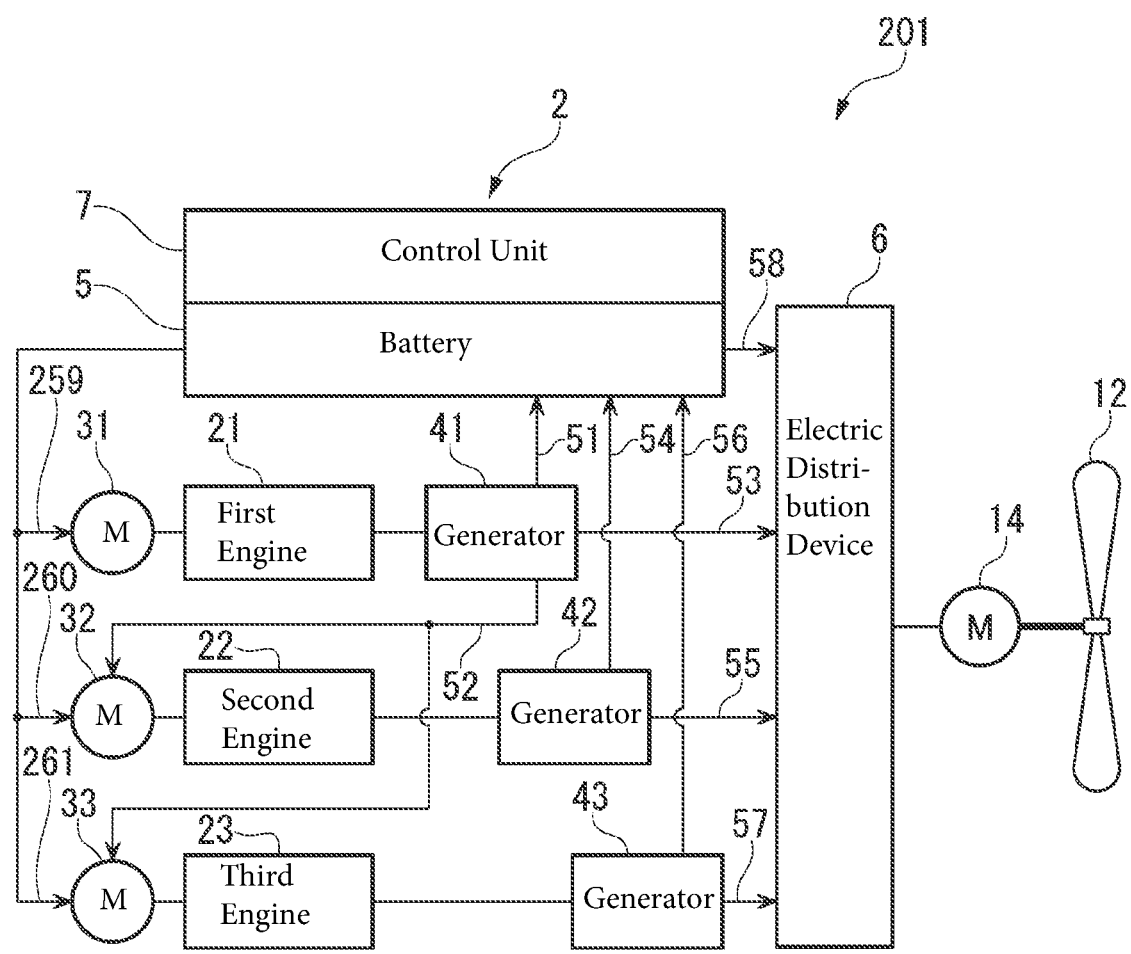
FIG. 5 is a schematic view of a constitution of a gas turbine system according to a second embodiment.

Next, a second embodiment according to the present invention will be described. FIG. 5 is a schematic view of a constitution of a gas turbine system 201 according to the second embodiment. In the following description, the same reference signs are applied to constitutions similar to those in the first embodiment described above, and description thereof will be suitably omitted. The present embodiment differs from the embodiment described above in that electricity is also supplied from the battery 5 to the second starter motor 32 and the third starter motor 33.

In the present embodiment, the battery 5 is electrically connected to each of the first starter motor 31, the second starter motor 32, and the third starter motor 33. Electricity from the battery 5 is supplied to the second starter motor 32 via a tenth circuit 260. Electricity from the battery 5 is supplied to the third starter motor 33 via an eleventh circuit 261. The battery 5 can independently supply electricity to each of the first starter motor 31, the second starter motor 32, and the third starter motor 33. When starting the gas turbine engines, after the main starting gas turbine engine (the first engine 21) is driven, the control unit 7 starts the secondary starting gas turbine engines (the second engine 22 and the third engine 23) using mixed electricity of electricity from the first generator 41 connected to the first engine 21 and electricity from the battery 5.

Specifically, the control unit 7 starts the first engine 21 using electricity from the battery 5 by turning on the ninth circuit 59 first. When the first engine 21 reaches a steady operation, the control unit 7 turns on the second circuit 52 and turns on the tenth circuit 260 and the eleventh circuit 261. Accordingly, the second engine 22 and the third engine 23 are started using mixed electricity of electricity from the first generator 41 and electricity from the battery 5.

Also when stopping the gas turbine engines, the control unit 7 may perform motoring of the second engine 22 and the third engine 23 using mixed electricity from the first generator 41 and the battery 5.

According to the present embodiment, only the main starting gas turbine engine (the first engine 21) selected from the plurality of gas turbine engines is started first using electricity from the battery 5. After the main starting gas turbine engine 21 reaches a steady state, the remaining secondary starting gas turbine engines (the second engine 22 and the third engine 23) are started using mixed electricity from the first generator 41 connected to the main starting gas turbine engine 21 and the battery 5. Accordingly, electricity generated by the main starting gas turbine engine 21 can be allotted as part of electricity necessary to start the secondary starting gas turbine engines 22 and 23. Thus, electricity consumption of the battery 5 can be reduced compared to the technologies in the related art in which all of the gas turbine engines are driven by means of only the electricity from the battery 5.

Therefore, electricity consumption of the battery 5 when starting the gas turbine engines can be reduced compared to the technologies in the related art, and thus sufficient electricity during flight can be secured from the battery 5.

Since there is no need to use a ground power unit when stopping the engines, landing can be performed without having places being limited. Moreover, since electricity consumption of the battery 5 on the ground can be reduced compared to the technologies in the related art, the capacity of the battery 5 can be reduced, and thus the battery 5 can be miniaturized. Accordingly, since the weight of the airframe 11 can also be reduced, a flight can be taken with an energy smaller than that in the related art, and thus energy saving of the aircraft 10 can be improved.

The technical scope of the present invention is not limited to the embodiments described above, and various changes can be added within a range not departing from the gist of the present invention.

In each of the embodiments described above, after the first engine 21 is started, the second engine 22 and the third engine 23 are started using electricity from the first generator 41, but it is not limited thereto. For example, after the first engine 21 is started, the second engine 22 may be started first using electricity from the first generator 41, and the third engine 23 may be started thereafter using electricity from the second generator 42. For example, after the first engine 21 is started, the second engine 22 may be started first using electricity from the first generator 41, and the third engine 23 may be started thereafter using electricity from the first generator 41 again. When a plurality of engines are started one by one in this manner, a load of the battery 5 can be reduced. The constitution of the embodiment, in which the second engine 22 and the third engine 23 are started using electricity from the first generator 41 after the first engine 21 is started, has an advantage in that a time taken until all of the engines are started can be shortened compared to when they are started one by one.

Similarly, when stopping the engines, for example, the control unit 7 may perform motoring of the third engine 23 using electricity from the second generator 42 after the third engine 23 is stopped and may perform motoring of the second engine 22 using electricity from the first generator 41 after the second engine 22 is stopped. For example, motoring of the third engine 23 may be performed using electricity from the first generator 41 after the third engine 23 is stopped, and motoring of the second engine 22 may be performed using electricity from the first generator 41 after the second engine 22 is stopped.

The number of a plurality of gas turbine engines is not limited to those in the embodiments described above. A plurality of gas turbine engines may be selected as a main starting gas turbine engine. A plurality of gas turbine engines may be selected as a main stopping gas turbine engine. Preferably, for the sake of lifetime management of the plurality of gas turbine engines 21, 22, and 23, it is desirable that the main starting gas turbine engine and the main stopping gas turbine engine be selected in turn to prevent bias in operating times. In order to realize this, in the gas turbine system 1 shown in FIG. 2, an electric circuit may be added. Specifically, similar to the ninth circuit 59, circuits for connecting the battery 5 to the starter motors 32 and 33 may be provided respectively. Moreover, similar to the second circuit 52, circuits for connecting the generator 42 to the starter motors 31 and 33 and circuits for connecting the generator 43 to the starter motors 31 and 32 may be provided. Also in the gas turbine system 1 shown in FIG. 5, similar to the second circuit 52, circuits for connecting the generator 42 to the starter motors 31 and 33 and circuits for connecting the generator 43 to the starter motors 31 and 32 may be provided.

A constitution in which the starter motors, the gas turbine engines, and the generators are disposed side by side in this order in the axial direction of the gas turbine engines is shown, but it is not limited to this disposition. For example, the generator may be provided between the compressor and the turbine of the gas turbine engine. The starter motor and the generator may be disposed on one side in the axial direction with respect to the gas turbine engine. In the embodiments described above, the starter motors and the generators are shown in separate blocks such that motoring and generation of electricity are described easily and distinctively, but they may be integrated as so-called starter generators.

The first completion condition and the second completion condition may adopt information other than temperatures as a parameter.

Furthermore, within a range not departing from the gist of the invention, the constituent elements in the embodiments described above can be suitably replaced with known constituent elements. In addition, the embodiments described above may be suitably combined.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

EXPLANATION OF REFERENCES 1, 201 Gas turbine system
2 Gas turbine system main body
5 Battery
6 Electricity distribution device
7 Control unit (Controller)
10 Aircraft
11 Airframe
12 Rotor (propeller)
14 Electric motor
16 Attachment member
21 First engine (plurality of gas turbine engines, main starting gas turbine engine, main stopping gas turbine engine)
22 Second engine (plurality of gas turbine engines, secondary starting gas turbine engine, secondary stopping gas turbine engine)
23 Third engine (plurality of gas turbine engines, secondary starting gas turbine engine, secondary stopping gas turbine engine)
31 First starter motor
32 Second starter motor
33 Third starter motor
41 First generator (generator)
42 Second generator (generator)
43 Third generator (generator)
51 First circuit
52 Second circuit
53 Third circuit
54 Fourth circuit
55 Fifth circuit
56 Sixth circuit
57 Seventh circuit
58 Eighth circuit
59, 259 Ninth circuit
260 Tenth circuit
261 Eleventh circuit

What is claimed is:

1. A gas turbine system comprising:
a plurality of gas turbine engines that are configured to be mounted in an airframe of an aircraft;
generators that are respectively connected to rotary shafts of the plurality of gas turbine engines;
a battery that stores electricity generated by the generators;
an electric motor that is driven by means of at least one of electricity from the generators and electricity from the battery;
a propeller that is driven by the electric motor; and
a controller that is configured to control outputs of the gas turbine engines,
wherein the controller is configured
to decide at least one main starting gas turbine engine from the plurality of gas turbine engines before the plurality of gas turbine engines are started,
to start the main starting gas turbine engine using electricity from the battery,
to start a secondary starting gas turbine engine of the plurality of gas turbine engines other than the main starting gas turbine engine using only electricity from the generator connected to the main starting gas turbine engine after the main starting gas turbine engine reaches a steady state,
to decide at least one main stopping gas turbine engine from the plurality of gas turbine engines before the plurality of gas turbine engines are stopped,
to stop driving of a secondary stopping gas turbine engine of the plurality of gas turbine engines other than the main stopping gas turbine engine,
to perform motoring of the secondary stopping gas turbine engine using only electricity from the generator connected to the main stopping gas turbine engine,
to stop driving of the main stopping gas turbine engine and perform motoring of the main stopping gas turbine engine using electricity from the battery after motoring of the secondary stopping gas turbine engine is completed,
wherein the controller performs these controls with the aircraft on the ground, and
selects the main starting gas turbine engine and the main stopping gas turbine engine in turn.

2. The gas turbine system according to claim 1, wherein the controller is configured
to stop motoring of the secondary stopping gas turbine engine and to stop driving of the main stopping gas turbine engine after a temperature of the secondary stopping gas turbine engine becomes a predetermined temperature or lower, and
to stop motoring of the main stopping gas turbine engine and performs motoring of the main stopping gas turbine engine after a temperature of the main stopping gas turbine engine becomes a predetermined temperature or lower.

3. The gas turbine system according to claim 1, wherein the plurality of gas turbine engines are each equipped with a starter motor, and
the gas turbine system further comprising an electric circuit that connects the starter motor and the battery.

4. The gas turbine system according to claim 1, wherein the plurality of gas turbine engines are each equipped with a starter motor, and
the gas turbine system further comprising an electric circuit that connects the generator and a second starter motor other than a first starter motor of the gas turbine engine that drives itself.

5. A gas turbine system comprising:
a plurality of gas turbine engines that are configured to be mounted in an airframe of an aircraft;
generators that are respectively connected to rotary shafts of the plurality of gas turbine engines;
a battery that stores electricity generated by the generators;
an electric motor that is driven by means of at least one of electricity from the generators and electricity from the battery;
a propeller that is driven by the electric motor; and
a controller that is configured to
control outputs of the gas turbine engines,
decide at least one main starting gas turbine engine from the plurality of gas turbine engines before the plurality of gas turbine engines are started,
start the main starting gas turbine engine using electricity from the battery, and
start a secondary starting gas turbine engine of the plurality of gas turbine engines other than the main starting gas turbine engine using mixed electricity from the generator connected to the main starting gas turbine engine and the battery after the main starting gas turbine engine reaches a steady state, wherein the controller is further configured to:
decide at least one main stopping gas turbine engine from the plurality of gas turbine engines before the plurality of gas turbine engines are stopped,
stop driving of a secondary stopping gas turbine engine of the plurality of gas turbine engines other than the main stopping gas turbine engine,
perform motoring of the secondary stopping gas turbine engine using mixed electricity from the generator connected to the main stopping gas turbine engine and the battery,
stop driving of the main stopping gas turbine engine and perform motoring of the main stopping gas turbine engine using electricity from the battery after motoring of the secondary stopping gas turbine engine is completed, and
wherein the controller performs these controls with the aircraft on the ground, and
selects the main starting gas turbine engine and the main stopping gas turbine engine in turn.

6. The gas turbine system according to claim 5, wherein the plurality of gas turbine engines are each equipped with a starter motor, and
the gas turbine system further comprising an electric circuit that connects the generator and a second starter motor other than a first starter motor of the gas turbine engine that drives itself.

* * * * *